Figure 1:
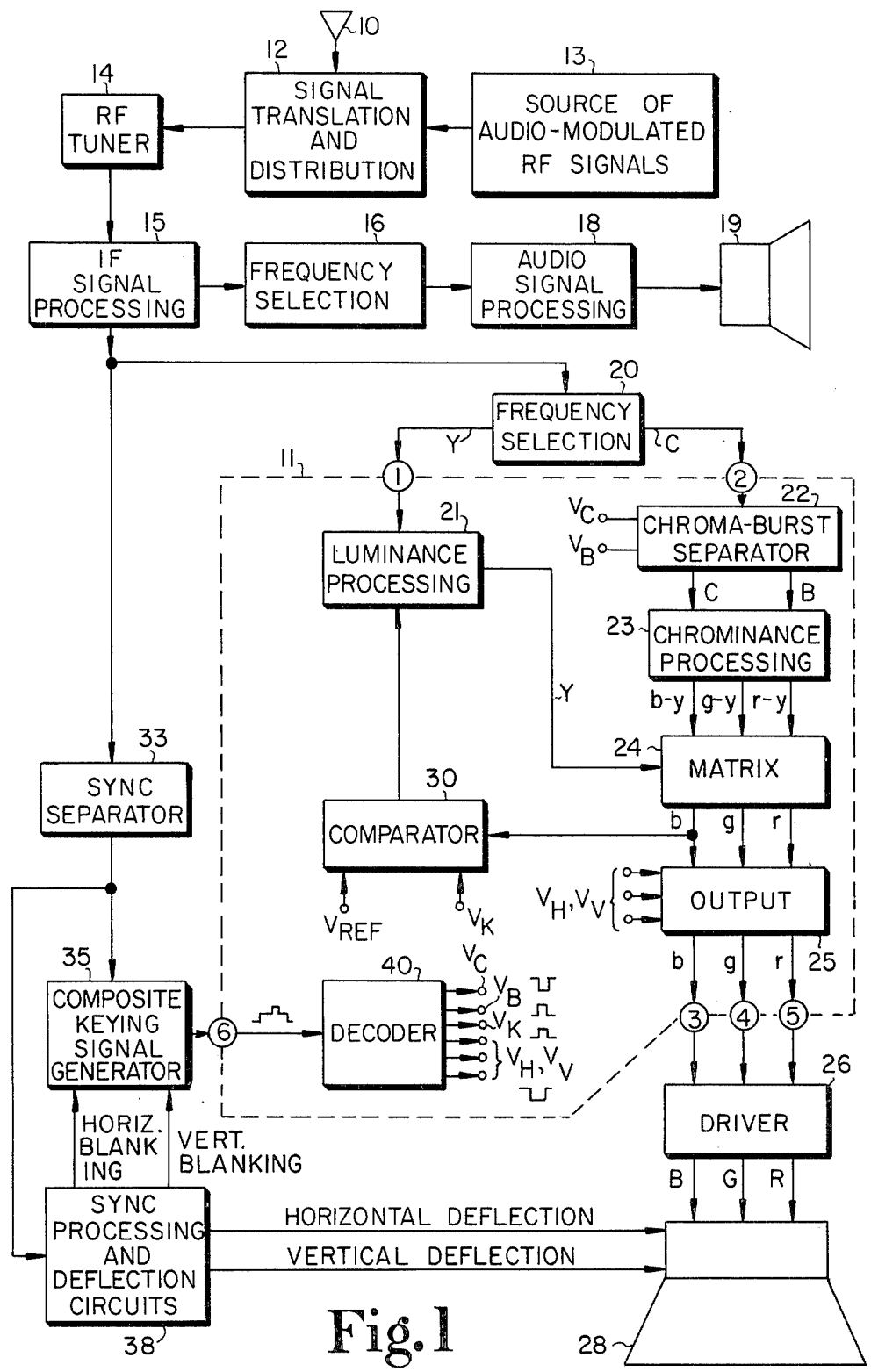

United States Patent [19]

Nicholson et al.

[11] 4,319,277
[45] Mar. 9, 1982

[54] INSTITUTIONAL AUDIO-VISUAL SYSTEM INCLUDING A PLURAL OPERATING MODE TELEVISION RECEIVER

[75] Inventors: John E. Nicholson, Indianapolis; Paul C. Wilmarth, Noblesville, both of Ind.

[73] Assignee: RCA Corporation, New York, N.Y.

[21] Appl. No.: 165,411

[22] Filed: Jul. 2, 1980

[51] Int. Cl.³ .............................................. H04N 5/68
[52] U.S. Cl. ...................................... 358/165; 358/86; 358/189
[58] Field of Search .................... 358/86, 165, 189; 315/384

[56] References Cited

U.S. PATENT DOCUMENTS

| 4,021,849 | 5/1977 | Wheeler | 358/165 |
| 4,038,681 | 7/1977 | Harwood | 358/20 |
| 4,051,518 | 9/1977 | Sendelweck | 358/20 |
| 4,197,557 | 4/1980 | Tuma et al. | 358/34 |
| 4,263,610 | 4/1981 | Shanley et al. | 358/20 |

OTHER PUBLICATIONS

RCA Television Service Data Bulletin No. 1978, Cl-1, for Hotel/Motel Series CT-88.
RCA Service Data Bulletin No. 1978, C-5, for CTC-88 Chassis.

*Primary Examiner*—Howard Britton
*Attorney, Agent, or Firm*—Eugene M. Whitacre; Paul J. Rasmussen; Ronald H. Kurdyla

[57] ABSTRACT

An institutional television system includes a source of standard broadcast composite television signals, an auxiliary source of RF carrier signals conveying sound information exclusive of video information, and a television receiver. The television receiver selectably processes the composite television signal including the sync component thereof in a normal mode, and selectably processes the auxiliary signals in an audio mode. The receiver comprises a video signal processing channel that is similarly energized in both the normal and audio modes. The video channel is controlled to enable light output from the kinescope of the receiver when the video sync component is present in the normal mode, and to inhibit light output from the kinescope when the video sync component is absent in the audio mode.

2 Claims, 4 Drawing Figures

INSTITUTIONAL AUDIO-VISUAL SYSTEM INCLUDING A PLURAL OPERATING MODE TELEVISION RECEIVER

This invention relates to a television receiver capable of operating in a first, normal mode in respose to a standard television signal modulated with video, video synchronizing and audio information, and also in a second mode in response to a signal modulated with audio information but without video and synchronizing modulation. In the second mode, the kinescope screen is dark (i.e., blanked) and the receiver reproduces only the audio information. In particular, this invention relates to a television receiver otherwise employed for normal video reproduction purposes, wherein substantially no modification of the receiver is required in order to render the receiver capable of operating in the described plural modes, compared with present receivers employed for such plural mode operation.

Television receivers presently used in the rooms of multiple room institutional facilities such as hotels, motels, and hospitals are often modified so that the occupants of individual rooms have the option of operating the receiver normally to receive conventional broadcast programming material including video and audio information, or operating the receiver so that only certain audio programming material (e.g., background music) is reproduced to the exclusion of video information. In the latter instance, hereinafter referred to as the audio mode, the kinescope screen is darkened or blanked and the receiver operation resembles that of a radio receiver when the receiver channel selector is set to a channel designated for use in the audio mode.

In practice, a television receiver used in an institutional environment is arranged to receive both standard broadcast television signals (e.g., via an antenna), and an auxiliary signal when the receiver operates in the audio mode. The auxiliary signal is generated locally external to the receiver, and typically includes an unmodulated radio frequency (RF) video carrier signal and a sound carrier modulated with audio information, at the frequency of a channel assigned for use in the audio mode. As a practical matter, the assigned audio mode channel corresponds to an unused video channel in a given geographical area. The received standard broadcast signal and the auxiliary signal are both applied to the (antenna) input of the receiver.

Receivers are institutional use must be modified significantly and adjusted to provide both normal and audio mode capability. A typical modification includes the addition of a mechanical switch (e.g., a micro-switch) or equivalent device to the tuner (channel selector) assembly of the receiver. The tuner also includes mechanical cams associated with the rotatable channel selector, and a cam rider operatively associated with the channel selector and the switch. The cams must be adjusted in advance by service personnel so that the switch is activated via the cam rider only when the channel selector is set to the channel (or channels) associated with the audio mode.

In the normal receiver operating mode for example, the switch is in a first position for supplying normal operating bias to video signal processing circuits of the receiver, such as the video output stages. When the channel selector is set to the channel assigned to the audio mode, the switch is placed in a second position via the cam rider, for removing the bias to the video processing circuits. This results in blanking the kinescope, causing the display screen to become dark. The receiver then processes the auxiliary audio signal, which is reproduced via the loudspeaker of the receiver.

A television receiver modified to provide normal and audio mode capability for institutional use is shown in an RCA Television Service Data Bulletin No. 1978 Cl-1 for the Hotel/Motel series of the CTC-88 series television receiver chassis, considered with the signal circuit schematic diagram for the CTC-88 chassis as shown in RCA Service Data Bulletin No. 1978 C-5. These bulletins are available from RCA Corporation Consumer Services, Camden, N.J.

The current practice of modifying and adjusting a conventional receiver for selective normal and audio mode operation is herein recognized as being costly, complicated, and time consuming to accomplish. A television receiver as disclosed herein avoids these disadvantages while providing the described plural operating mode capability desired for an otherwise conventional receiver used in an institutional environment.

An institutional television system according to the present invention includes a television receiver and a source of a plurality of modulated RF carrier signals occupying respectively different spectrum channels. At least one of the channels is occupied by modulated RF carrier signals of a first type, conveying television picture information with accompanying sound information and comprising a picture carrier modulated by composite video signals including a video sync component. Another of the channels is occupied by modulated RF carrier signals of a second type, conveying sound information to the exclusion of the television picture information and comprising a picture carrier devoid of video signal modulation. The television receiver includes an adjustable input network coupled to the source of RF carrier signals for selectably rendering the television receiver responsive to a selected one of the channels, and for developing a first output representative of the sound information conveyed by the selected channel and a second output representative of the video signal modulation, if any, of the picture carrier of the selected channels. The receiver also comprises a sound reproducer arranged to respond to the first output of the adjustable input network, an image reproducing kinescope, a video signal processing network, and a sync separator. The video signal processing network is similarly energized for each channel selection condition of the adjustable input network, and has an input responsive to the second output of the adjustable input network and an output coupled to the kinescope for controlling the light output of the kinescope. They sync separator responds to the second output of the adjustable input network for developing a separated sync component only when the selected channel is occupied by modulated RF carrier signals of the first type. The operation of the video signal processing network is controlled in accordance with the output of the sync separator such that (1) the light output of the kinescope is controlled in accordance with the video signal modulation when the output of the sync separator indicates that the selected channel is occupied by modulated RF carrier signals of the first type, and (2) the light output of the kinescope is inhibited when the output of the sync separator indicates that the selected channel is occupied by modulated RF carrier signals of the second type.

Figure 2:
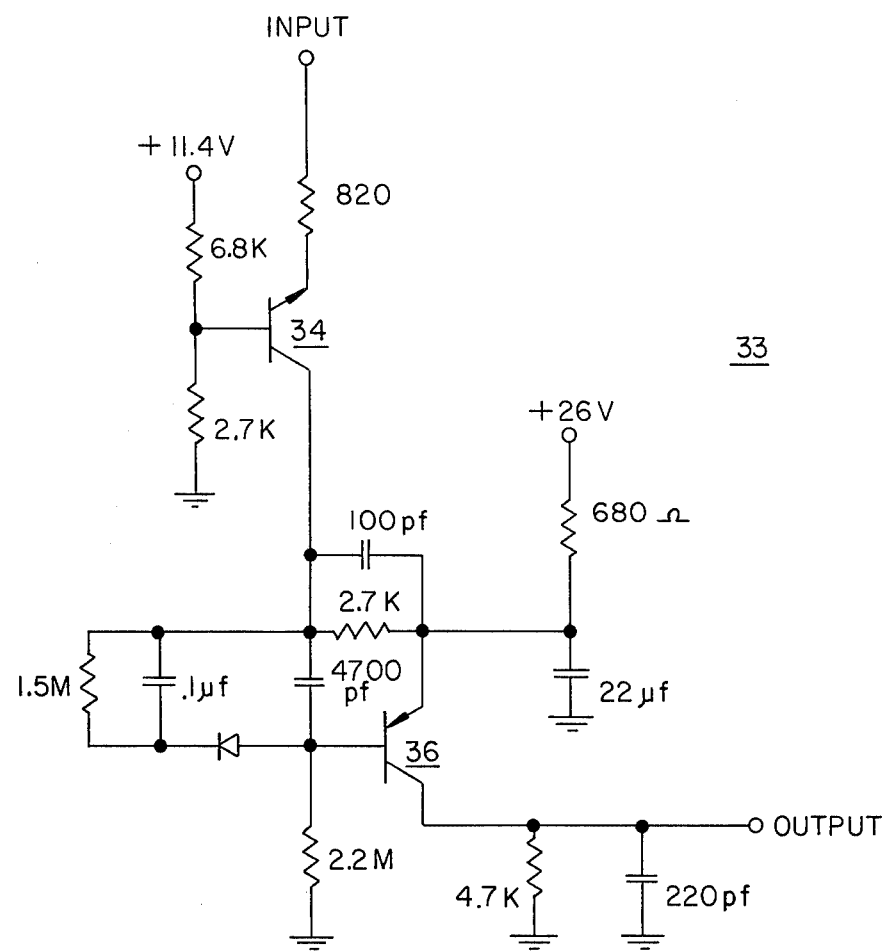
Figure 3:
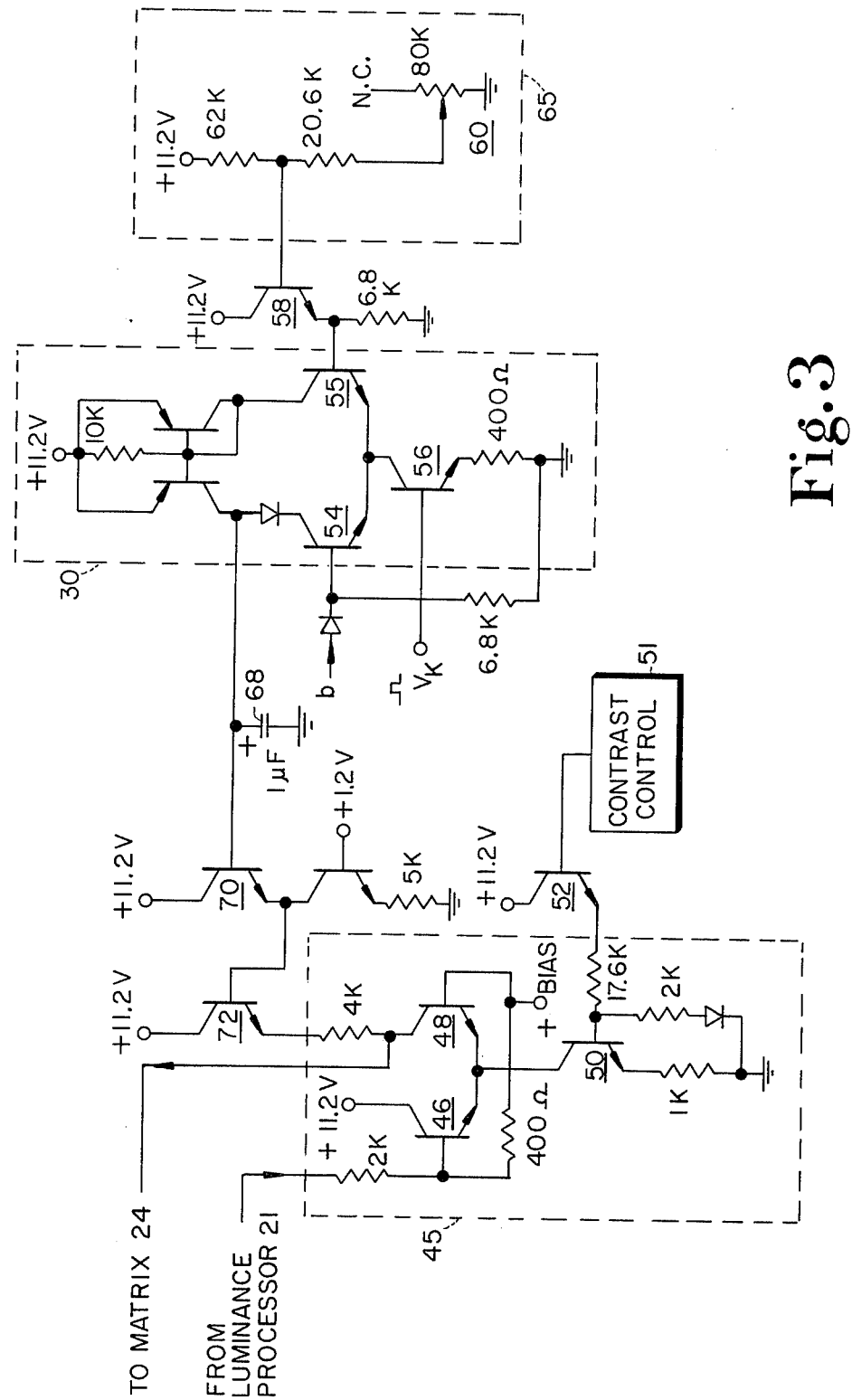
Figure 4:
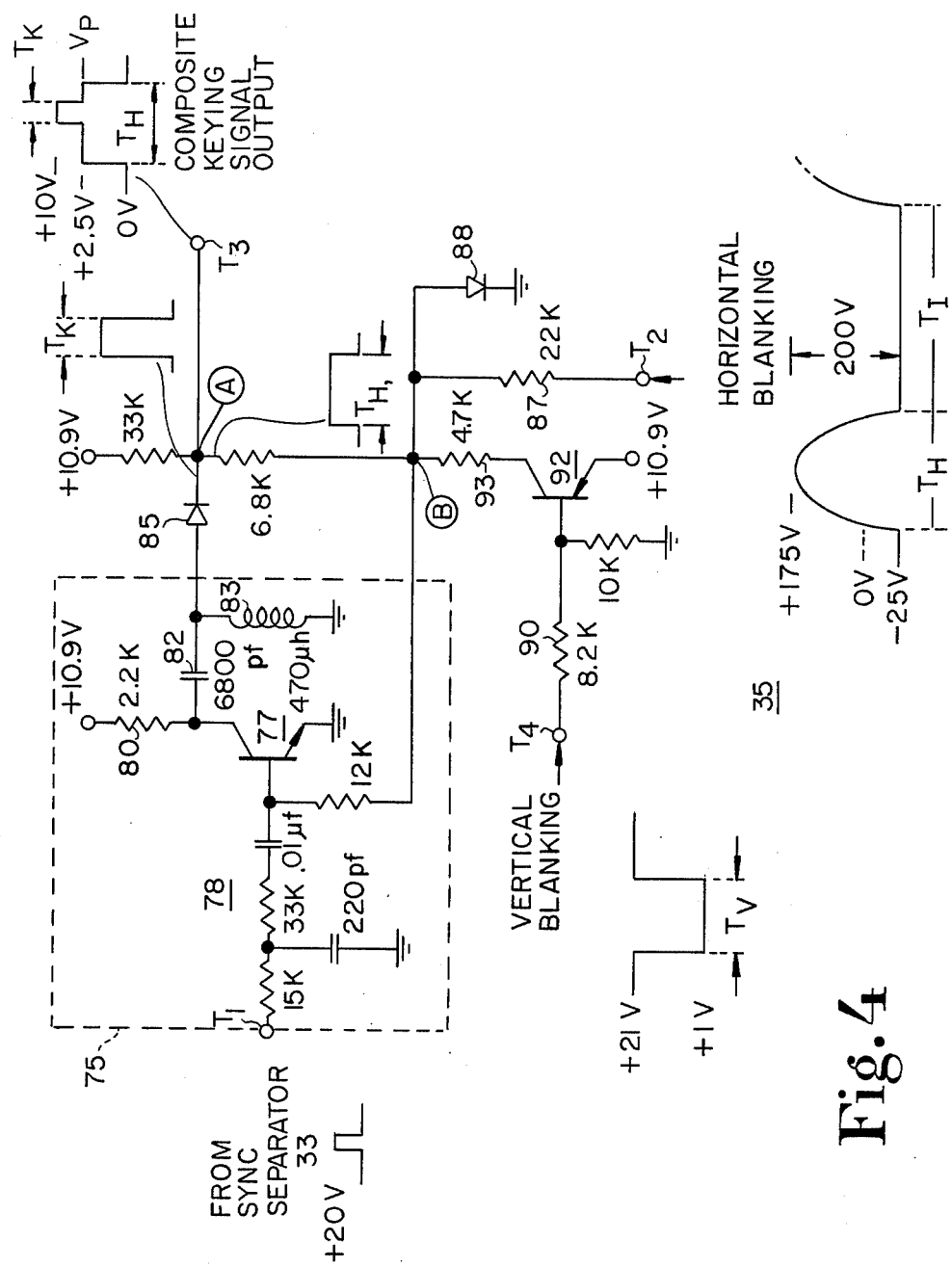

In the drawing:

FIG. 1 shows a block diagram of a system including a color television receiver arranged according to the present invention; and FIGS. 2-4 illustrate circuit diagrams of portions of the receiver shown in FIG. 1.

In the system of FIG. 1, standard broadcast composite television signals (i.e., including video, sound and video synchronizing information) are received by an antenna 10 and coupled to one input of a signal translation and distribution unit 12. Another input of unit 12 receives a locally generated radio frequency (RF) signal from a source 13. The signal from source 13 comprises an unmodulated video RF carrier (i.e., without video and video synchronizing information) and a sound carrier frequency modulated with audio information, at the video and sound carrier frequencies of a locally unused broadcast channel designated for use in the audio mode of the receiver, as will be discussed. Unit 12 combines the signals from antenna 10 and source 13 and provides signals suitable for application to antenna input terminals of the receiver. Unit 12 also includes television signal distribution amplifier networks for developing a high level output signal to facilitate supplying signals to a plurality of television receivers via appropriate signal distribution networks (not shown).

The signals from unit 12 are coupled via antenna input terminals of the receiver to an input of an RF tuner 14 including a frequency selective channel selector mechanism, and RF amplifier and mixer stages for providing an intermediate frequency (IF) output signal. The IF output signal from tuner 14 is processed by a unit 15 including IF signal processing and detector stages.

A first output of unit 14 at which IF signals appear is applied to a frequency selection network 16 for deriving the sound component of the television signal. The derived sound component is afterwards processed by audio signal processing circuits 18 for developing an audio output signal suitable for driving a loudspeaker 19.

A second output of unit 15 at which IF signals appear is applied to a frequency selection bandpass network 20 (e.g., including a comb filter) for providing separated luminance (Y) and chrominance (C) components of a composite color television signal at respective outputs. The second output of IF unit 15 is also coupled to a sync separator 33 for deriving the horizontal line synchronizing (sync) component of the television signal. The derived sync component is supplied from an output of sync separator 33 to sync processing and deflection circuits 38. Circuits 38 (e.g., including free-running, synchronized horizontal and vertical oscillators) provide horizontal and vertical deflection signals for application to deflection control circuits of receiver kinescope 28, and vertical and horizontal (flyback) line blanking signals. These signals, as well as sync signals from sync separator 33, are supplied as inputs to a composite keying signal generator 35, as will be discussed.

The separated luminance (Y) and chrominance (C) components from frequency selection network 20 are applied to respective input terminals 1 and 2 of a luminance and chrominance signal processing network 11. The separated liminance component is processed by a luminance signal processing unit 21 in a luminance channel of the receiver, including signal amplification and peaking stages for example. The separated chrominance component is supplied to a keyed chrominance-burst separator 22, which provides separated burst information (B) and chrominance picture information (C). Signal separator 22 can be of the type described in U.S. Pat. No. 4,038,681 of L. A. Harwood. The separated signals are then supplied to a chrominance signal processing unit 23 for developing r-y, g-y and b-y color difference signals as known. The color difference signals from unit 23 are combined with an amplified luminance output signal (Y) from unit 21 in a signal matrix 24, for developing output r, b and g color image signals.

The luminance channel also includes a blanking level clamp comprising a keyed comparator 30 which is keyed during the burst interval of each video signal horizontal blanking interval. When keyed, comparator 30 samples and compares a brightness reference voltage $V_{REF}$ with the D.C. level of the signal then appearing at the b (blue) signal output of matrix 24. An output signal from comparator 30 is supplied to a control input of luminance processor 21, for establishing the blanking level of the luminance signal (and thereby picture brightness) at a correct level in accordance with the level of voltage $V_{REF}$. The arrangement of comparator 30 with luminance processor 21 and matrix 24 is described in detail in U.S. Pat. No. 4,197,557 of A. V. Tuma, et al.

The r, g, b color signals from matrix 24 are separately coupled via plural output networks included in an output unit 25, to output terminals 3, 4 and 5 of network 11. The color signals are amplified individually by amplifiers within a kinescope driver stage 26 to provide high level output color signals R, B and G, which are then coupled to respective intensity control electrodes (e.g., cathodes) of color image reproducing kinescope 28.

Signal generator 35 develops a periodic composite ("sandcastle") keying signal in response to separated horizontal sync pulses from sync separator 33, and horizontal and vertical retrace blanking signals from deflection circuits 38. A composite keying signal output from generator 35 is supplied via a terminal 6 to a signal decoder 40, which decodes the composite keying signal into keying pulses, $V_B$, $V_C$, $V_K$ and $V_H$, $V_V$ as required by keyed signal processing circuits within network 11. Decoder 40 is shown in detail in a copending U.S. patent application Ser. No. 113,371 of R. L. Shanley, II, et al., now U.S. Pat. No. 4,263,610, entitled "Controlled Output Composite Keying Signal Generator For A Television Receiver."

Keying pulses $V_B$ and $V_C$ encompass the burst interval and exhibit a mutually antiphase (push-pull) relationship, and are applied to keying inputs of chroma-burst separator 22. Keying pulse $V_K$ is in-phase with and of the same (positive) polarity as pulse $V_B$, and is applied to a keying input of comparator 30. Plural keying pulses $V_H$, $V_V$ occur during each horizontal and vertical image retrace interval, and are applied to respective plural keying inputs of output stage 25.

In the arrangement of FIG. 1, the blocks within network 11 are largely capable of being fabricated as a single integrated circuit. In such case, terminals 1-6 correspond to external connecting terminals of the integrated circuit.

FIG. 2 shows a circuit arrangement of sync separator 33 in FIG. 1. Input signals from the second output of I.F. unit 15 (FIG. 1) are applied to the emitter circuit of a transistor 34. The output of sync separator 33 is provided from the collector circuit of a transistor 36.

FIG. 3 is a circuit diagram illustrating the arrangement of comparator 30 (FIG. 1) and associated networks in greater detail.

A luminance amplifier 45 included in processor 21 (FIG. 1) comprises differentially-connected transistors 46, 48 and an associated current source transistor 50. The gain of amplifier 45 and thereby the amplitude of signals processed by amplifier 45 is adjustable by means of a viewer adjustable contrast control network 51 (e.g., a potentiometer) coupled to current source transistor 50 via a transistor 52. Comparator 30 comprises differentially-connected input transistors 54, 55 and an associated keyed current source transistor 56. Transistor 56 is keyed to conduct in response to positive keying pulses $V_K$ which occur during each horizontal blanking interval, and which are derived by decoder 40 (FIG. 1).

Signal b from matrix 24 is supplied to a video signal input of comparator 30 at the base input of transistor 54. A signal applied to the reference input of comparator 30, corresponding to the base input of transistor 55, is coupled via a follower transistor 58. This signal comprises a brightness reference voltage derived from the wiper of a viewer adjustable resistor 60 included in a network 65. An output signal from comparator 30 is derived from the collector circuit of transistor 54 (including a transistor active load circuit), and is developed on and stored by a filter capacitor 68. The level of voltage on capacitor 68 increases or decreases in accordance with the difference in magnitude between the input signals supplied to comparator transistors 54 and 55, when these transistors are rendered conductive as current source transistor 56 is keyed to conduct during the periodic blanking intervals.

The voltage on capacitor 68 is coupled via transistors 70 and 72 to the collector output circuit of transistor 48 in amplifier 45, for controlling the D.C. level of the luminance output signal of amplifier 45 in accordance with the control voltage on capacitor 68 as developed during the horizontal blanking intervals. The corresponding D.C. blanking levels of the r, g, b color signals from matrix 24 are modified accordingly. By closed loop control action, the control voltage developed on capacitor 68 in response to the operation of comparator 30 serves to vary the D.C. blanking level of the color signals in a direction to minimize the difference between the levels of the signals applied to comparator transistors 54 and 55, thereby effecting the desired control of the D.C. level of the video signals ultimately supplied to the kinescope.

It is noted that with the arrangement of comparator 30 and storage capacitor 68, capacitor 68 will discharge via transistor 70 when the operation of comparator 30 is disabled due to the absence of keying signals $V_K$. In this event the reduced charge on capacitor 68 is in a direction to modify the D.C. level of the luminance output signal from amplifier 45 towards black level. Accordingly, the kinescope display is dark (i.e., black) within a short time after normal keying of comparator 30 is interrupted.

Referring now to FIG. 4, there is shown a circuit arrangement of composite keying signal generator 35, of the type shown in copending U.S. patent application Ser. No. 113,371, now U.S. Pat. No. 4,263,610 noted previously.

A separated, positive horizontal sync pulse from sync separator 33 is supplied to an input terminal $T_1$ of a network 75. Network 75 comprises a burst gate pulse generator of the type disclosed in U.S. Pat. No. 4,051,518 of G. K. Sendelweck. Network 75 includes a normally nonconductive common emitter switching transistor 77 with an associated input signal coupling circuit 78, and an output load circuit including a collector load impedance 80 and a resonant circuit comprising a capacitor 82 and an inductor 83.

The resonant circuit is excited into ringing at its natural frequency when transistor 77 conducts in response to the leading edge of the positive horizontal sync pulse, as applied to a base of transistor 77 via coupling network 78. The period of the ringing signal is determined by the values of capacitor 82 and inductor 83. A resulting output ringing signal in the collector circuit of transistor 77 coacts with the inverse conduction characteristics of transistor 77 to turn off transistor 77 prior to the completion of one full cycle of ringing, to inhibit amplitude excursions of the ringing signal beyond the first full cycle so that a positive output voltage pulse produced at the junction of capacitor 82 and inductor 83 corresponds to the first full half cycle (of positive polarity) of the ringing signal. The positive output pulse occurs over interval $T_K$ within horizontal interval $T_H$, and encompasses the burst interval. A diode 85 couples the positive output pulse to a circuit point A.

Positive horizontal flyback blanking pulses from circuits 38 (FIG. 1) are coupled to a point B via a terminal $T_2$ and a resistor 87. Also coupled to point B is a clamping diode 88. Point B is clamped to the junction offset voltage of diode 88 (+0.7 volts) when diode 88 conducts during horizontal blanking interval $T_H$ in response to the flyback pulse. At the same time, a voltage of approximately +2.5 volts is developed at point A over horizontal blanking interval $T_H$.

A composite keying signal including first and second pulse components is produced at an output terminal $T_3$ as a result of the described circuit operation. During each horizontal blanking interval $T_H$, the first (lower) pulse component with a blanking pedestal level $V_P$ (+2.5 volts) is produced in response to the flyback pulse applied to point B. The burst gate output pulse provided by the conduction of transistor 77 comprises a second (upper) pulse component of the composite keying signal. The second pulse, occurring over interval $T_K$, is superimposed on the first pulse component. This second pulse is decoded by decoder 40 (FIG. 1) to provide the keying pulse $V_K$ employed to key comparator 30 (FIG. 1).

Analagous observations pertain with respect to generating a composite vertical blanking signal during vertical blanking interval $T_V$. During each vertical retrace blanking interval $T_V$, a negative-going vertical blanking pulse is coupled to point B via a terminal $T_4$, a resistor 90, a transistor 92 and a resistor 93. The vertical blanking pulse causes transistor 92 to conduct over interval $T_V$. Diode 88 is rendered conductive to clamp point B to +0.7 volts, and a voltage then developed at point A corresponds to the desired level of the lower pulse component for vertical blanking purposes. The waveforms of composite keying signals developed for both horizontal and vertical pusposes are shown in detail in aforementioned U.S. patent application Ser. No. 113,371 of R. L. Shanley, II, et al., now U.S. Pat. No. 4,263,610.

The receiver as so far described is advantageously used in an institutional environment where the receiver is intended to reproduce audio programming material alone in an audio operating mode, as well as normal video broadcast material in a normal mode.

When the channel selector of an institutional use receiver of the type described is set to a channel designated for operation in the audio mode, the receiver reproduces only the audio information as contained in the signal supplied by source 13 in FIG. 1. In this situation sync separator 33 remains in a quiescent state due to the absence of video sync components in the signal supplied by source 13. Circuit 75 of composite keying signal generator 35 as shown in FIG. 4 therefore is not keyed to produce the upper keying pulse component of the composite keying output signal that otherwise would be developed during interval $T_K$ of each horizontal blanking interval $T_H$ in the normal video operating mode. Accordingly, the derived keying pulses $V_K$ employed to key comparator 30 in the normal video mode are absent. Comparator 30 therefore is disabled with the result that comparator storage capacitor 68 (FIG. 3) discharges a short time after keying of comparator 30 is disrupted, as noted earlier, and the viewing screen of the kinescope is caused to exhibit a uniformly dark level (i.e., the kinescope display is blanked).

Thus in accordance with the disclosed system, the kinescope is blanked automatically when the receiver is set to operate in the audio mode. The receiver does not require an additional mechanical switch or equivalent mechanism to blank the kinescope when the channel selector is set to an audio mode channel. In addition, it is not necessary to adjust mechanical cams or other devices in the tuner assembly so that the switch is activated only when the audio mode channel is selected.

Another circuit version of composite keying signal generator 35 advantageously used with a television receiver intended for both normal and audio mode operation is described in a copending U.S. patent application Ser. No. 165,933, filed July 2, 1980, of James Hettiger entitled "Keying Signal Generator Responsive To Plural Input Signals." The operation of that circuit is also controlled in response to the output of the sync separator and retrace blanking signals, and similarly is not keyed to produce the upper keying pulse component of the composite keying signal during interval $T_K$ when the receiver operates in the audio mode.

What is claimed is:

1. An institutional television system including a television receiver and a source of a plurality of modulated RF carrier signals occupying respectively different spectrum channels, with at least one of said channels occupied by modulated RF carrier signals of a first type conveying television picture information with accompanying sound information and inclusive of a picture carrier modulated by composite video signals inclusive of a video sync component occurring during synchronizing intervals also including a blanking level representative of image brightness, and another of said channels occupied by modulated RF carrier signals of a second type conveying sound information to the exclusion of television picture information and inclusive of a picture carrier devoid of video signal modulation; said television receiver including:

adjustable input means, coupled to said source, for selectably rendering said television receiver responsive to a selected one of said channels and for developing a first output representative of the sound information conveyed by said selected channel and a second output representative of the video signal modulation, if any, of the picture carrier of said selected channel;

a sound reproducer;

means for rendering said sound reproducer responsive to said first output;

an image display device;

video signal processing means similarly energized for each channel selection condition of said adjustable input means and having an input responsive to said second output of said adjustable input means and an output coupled to said image display device for controlling the light output thereof;

a sync separator responsive to said second output of said adjustable input means for developing a separated sync component only when the selected channel is occupied by modulated RF carrier signals of said first type; and means for controlling the operation of said video signal processing means in accordance with the output of said sync separator such that (1) the light output of said image display device is controlled in accordance with said video signal modulation when the output of said sync separator indicates that the selected channel is occupied by modulated RF carrier signals of said first type, and (2) the light output of said image display device is inhibited when the output of said sync separator indicates that the selected channel is occupied by modulated RF carrier signals of said second type; wherein said controlling means comprises:

means for deriving periodic keying signals from said video sync component of said composite video signal such that said keying signals are interrupted in the absence of said video sync component;

keyed control means normally operative in response to said keying signals, for providing an output signal normally corresponding to an image brightness control signal;

means for coupling said output signal of said keyed control means to said video signal processing means for normally controlling the blanking level of video signals processed thereby and accordingly controlling the brightness of an image reproduced by said image display device; and wherein said keyed control means is disabled when said keying signals are interrupted in the absence of said video sync component such that said output signal of said keyed control means exhibits a magnitude and sense sufficient to blank output signals from said video signal processing means for inhibiting the light output of said image display device.

2. A system according to claim 1, wherein:

said keyed control means operates during synchronizing intervals of said video signal in response to said keying signals, for comparing a brightness reference signal and said brightness determinative blanking level of said video signal to provide said brightness control signal.

* * * * *